United States Patent [19]

Hamilton et al.

[11] 3,842,713
[45] Oct. 22, 1974

[54] ASPHERIC LENS GENERATOR

[75] Inventors: Vern E. Hamilton, Palos Verdes Estates; Eugene K. Thorburn, Santa Ana, both of Calif.

[73] Assignee: McDonnell Douglas Corporation, Santa Monica, Calif.

[22] Filed: June 4, 1973

[21] Appl. No.: 366,843

[52] U.S. Cl. .................. 90/11 C, 33/28, 33/31, 51/124 L, 51/284, 90/20, 82/1.3
[51] Int. Cl. ........................ B23c 3/04, B23c 5/12
[58] Field of Search...... 51/145 R, 284, 124 L, 131; 33/28, 31; 90/11 C, 20; 82/1.3, 18

[56] References Cited
UNITED STATES PATENTS
2,479,204  8/1949  Buchele.......................... 51/124 L
FOREIGN PATENTS OR APPLICATIONS
870,630  3/1953  Germany ........................... 90/20

Primary Examiner—Francis S. Husar
Attorney, Agent, or Firm—D. N. Jeu; Walter J. Jason; Donald L. Royer

[57] ABSTRACT

Means and method of generating an aspheric surface on a workpiece which is normally supported horizontally and rotated about a vertical axis, wherein a line cutting element is driven so that its cutting edge is moved along a predetermined locus which is maintained in a plane that intersects with the workpiece at a selected angle with respect to horizontal and the cutting edge cuts the workpiece in following the locus whereby a predetermined surface of revolution is generated on the workpiece by the combined motions of the cutting element and the workpiece. A smoothly faired surface of revolution can be obtained by passing the cutting edge locus exactly through a selected point on the vertical rotation axis of the workpiece.

10 Claims, 12 Drawing Figures

PATENTED OCT 22 1974  3,842,713
SHEET 1 OF 4

3,842,713

ASPHERIC LENS GENERATOR

BACKGROUND OF THE INVENTION

Our present invention pertains generally to the art of generating aspheric surfaces on lenses, dies, radomes, and other objects requiring such surfaces. More particularly, the invention relates to a novel means and method of generating a surface of revolution with high contour precision on a lens, die, radome, or other object.

In the forming or grinding of a lens, for example, it is well known that accuracy of surface contour formation is usually more important to achieve than other geometrical factors such as lens thickness or size. The desired surface on a prescribed lens can, of course, be formed by various types of suitable grinding apparatus. One type of apparatus for forming an aspheric asymmetric lens is illustratively shown, described and claimed in U.S. Pat. No. 2,885,832 of Joseph A. Briggs entitled "Art of Forming Surfaces of Peculiar Contours" and patented May 12, 1959.

The Briggs apparatus includes a lens grinding or profiling machine having a tiltable turntable mounting a lens blank, and a movable carriage mounting a motor-driven tool for cutting the rotated blank. Movement of the carriage moves the cutting tool substantially along a radius of the blank and also produces a predetermined and related undulatory movement of the cutting tool by cam-controlled means engaged by the carriage. Simultaneously, movement of the carriage further causes a predetermined and related tilting movement of the turntable through a cam-controlled connecting linkage. Typically, however, the cam control means for the machine must be made with high precision since any errors therein are directly reflected in surface formation accuracy.

SUMMARY OF THE INVENTION

Briefly, and in general terms, our invention is preferably accomplished by providing, in a first embodiment, aspheric surface generating means including a normally horizontal turntable for mounting and rotating a lens blank or workpiece about a vertical axis, and a ribbon type cutting blade which is driven such that its cutting edge is moved along a predetermined locus which is confined in a plane that intersects with the workpiece at a selected angle with respect to horizontal and the cutting edge cuts the workpiece while following the locus so that a predetermined surface of revolution is generated on the workpiece by the combined motions of the cutting blade and the workpiece. This first embodiment is capable of generating both conicoid and non-conicoid aspheric surfaces of revolution.

In a second embodiment which is capable of generating conicoid aspheric surfaces only, the generating means is basically the same as in the first embodiment except that a flycutter arrangement utilizing an ellipsograph with a cutting tool replacing the usual pencil is used instead of the ribbon type cutting blade. The ellipsograph can be adjustably positioned and the cutting tool driven such that its cutting edge is moved along a predetermined locus which is confined in a plane that intersects with the workpiece at a selected angle with respect to horizontal and, as in the first embodiment, the cutting edge cuts the workpiece while following the locus so that a predetermined surface of revolution is generated on the workpiece by the combined motions of the cutting tool and the workpiece. The ribbon type cutting blade of the first embodiment and the ellipsograph flycutter of the second embodiment are, of course, both line cutting devices or elements.

BRIEF DESCRIPTION OF THE DRAWINGS

Our invention will be more fully understood, and other advantages and features thereof will become apparent, from the following description of certain exemplary embodiments of the invention. The description is to be taken in conjunction with the accompanying drawings, in which.

DESCRIPTION OF THE PRESENT EMBODIMENTS

In the following description of certain exemplary embodiments of our invention, some specific values and types of components are disclosed. It is to be understood, of course, that such values and types of components are given as examples only and are not intended to limit the scope of this invention in any manner.

Figure 1:
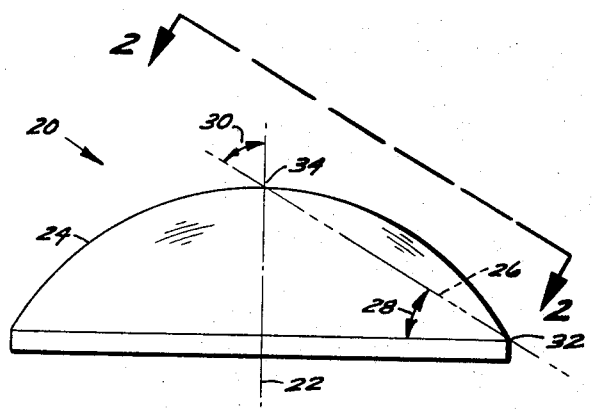
FIG. 1 is a side elevational view of a lens workpiece having an aspheric surface of revolution thereon and a plane intersecting with the aspheric surface at a selected angle with respect to horizontal.

FIG. 1 is a side elevational view of, for example, a relatively large plastic lens workpiece 20 which is symmetrical about its central vertical axis 22. The lens 20 is horizontally disposed and has a known or predetermined aspheric surface of revolution 24 thereon. A plane 26 is indicated intersecting with the aspheric surface 24 at a selected angle 28 with respect to horizontal (i.e., with respect to a plane perpendicular to the axis 22) or at the complementary angle 30 with respect to vertical. In this instance, the plane 26 is chosen to pass through the aspheric surface 24 from an edge point 32 to the surface pierce point 34 of the axis 22.

Figure 2:
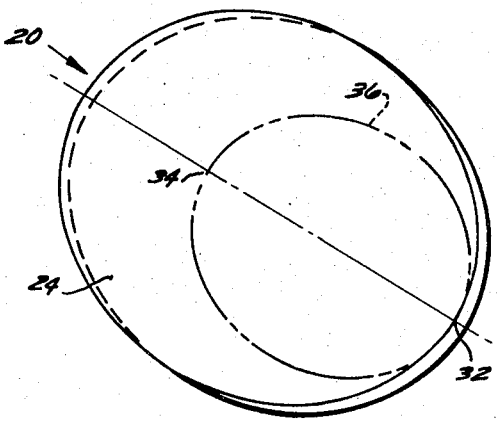
FIG. 2 is a view looking down upon the workpiece as taken along the line 2—2 indicated in FIG. 1.

FIG. 2 is a view looking down upon the lens 20 as taken along the line 2—2 indicated in FIG. 1. It can be readily seen that the intersection of the plane 26 and the aspheric surface 24 is a closed curve 36. Thus, conversely, the aspheric surface 24 can be generated by a line cutting element or tool engaging a horizontally disposed lens blank or workpiece which is rotated on its central vertical axis, and the cutting element or tool is driven so that its cutting edge passes through the vertical axis and follows the curve 36 located in a plane intersecting with the workpiece at the angle 28 (FIG. 1) with respect to horizontal.

The desired aspheric surface 24 is ordinarily known or predetermined and, of course, the curve 36 produced by a plane 26 intersecting with the aspheric surface at a selected or given angle can then be graphically or mathematically determined or calculated. Once the curve 36 is determined, the line cutting element or tool can be suitably constrained and driven to produce the desired aspheric surface 24 on a properly positioned and rotated workpiece. It may be noted that where the plane 26 intersects with a conicoid aspheric surface of revolution which has been generated by rotation of a conic section curve (i.e., a hyperbola, ellipse or parabola), the closed curve 36 is always a true ellipse. This is rigorously true mathematically and is not a mere approximation. If the aspheric surface 24 is not a conicoid, then the closed curve 36 is not an ellipse but is still a closed curve. Of course, if the surface 24 is spherical, the curve 36 is then a circle.

Figure 3:
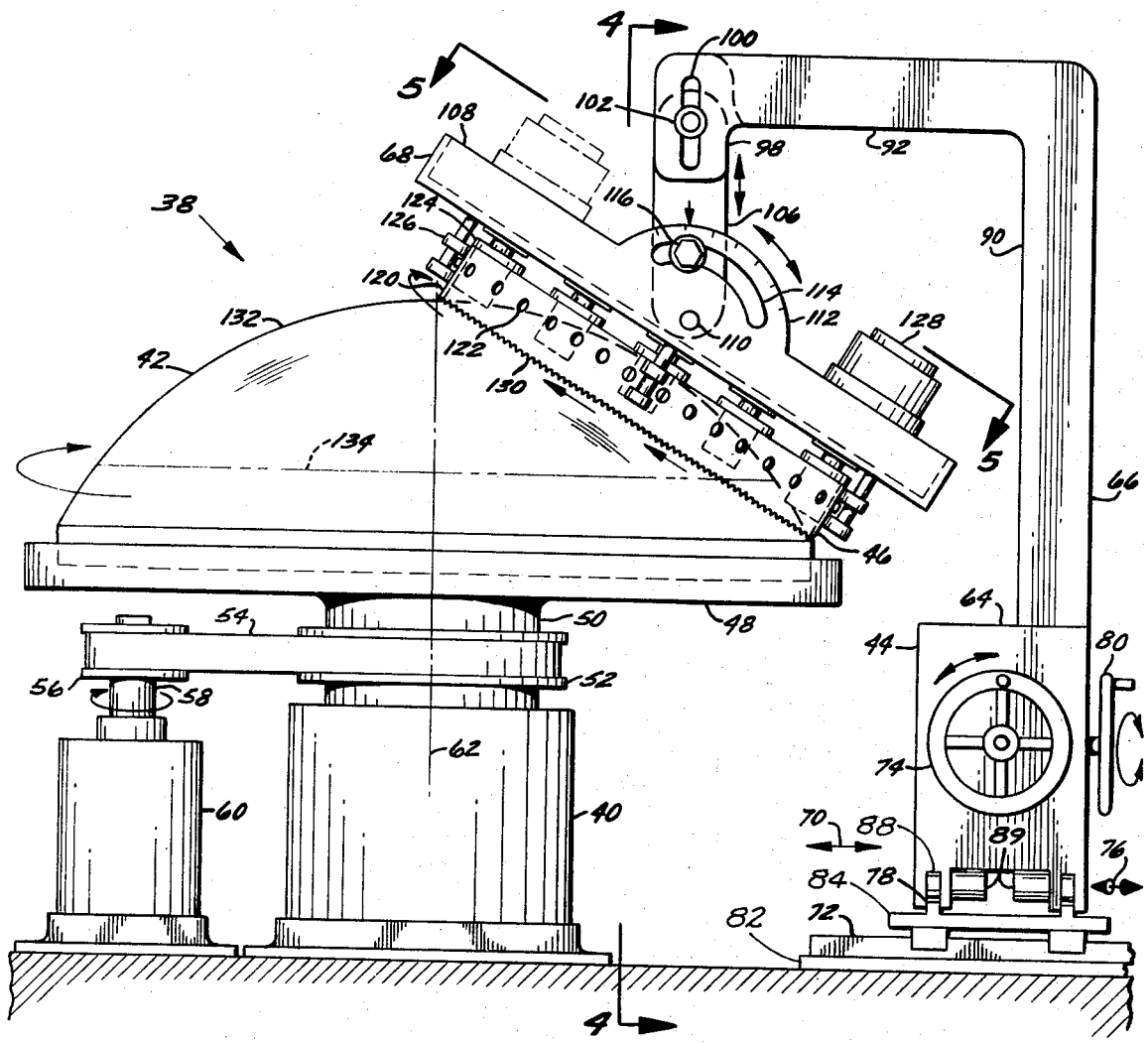
FIG. 3 is a side elevational view of one embodiment of the apparatus for generating aspheric surfaces according to this invention.

FIG. 3 is a side elevational view of one embodiment 38 of the apparatus for generating aspheric surfaces according to this invention. The embodiment 38 is capable of generating both conicoid and non-conicoid aspheric surfaces. This apparatus 38 broadly comprises a turntable 40 for mounting and rotating a workpiece 42, and a movable component 44 for supporting and positioning a line cutting element 46 against the workpiece. The turntable 40 includes a mounting platform 48 affixed horizontally to the upper end of a vertical shaft 50 which is suitably journaled rotatably on its lower portion. A pulley 52 is affixed to the upper portion of shaft 50 and is connected by belt 54 to another pulley 56 affixed to the output shaft 58 of a variable speed motor 60. The workpiece 42 is positioned on and suitably secured to the platform 48 which can be rotated on its axis 62 at a chosen speed by the drive motor 60 and belt 54 arrangement.

The movable component 44 includes a stand 64 mounting an angled beam 66, and a cutting tool drive and support structure 68 suitably connected to the upper end of the angled beam. The stand 64 is conventionally movable back and forth in the direction of arrow 70 on a set of tracks 72 by adjustment wheel 74, and sideways in the direction of arrow 76 on another set of tracks 78 by another adjustment wheel 80. The tracks 72 can be located on foundation strips 82, and the tracks 78 can be located on a movable base plate 84. The two sets of tracks 72 and 78 are, of course, engaged by respective sets of rollers 86 (FIG. 4) and 88 which can be actuated by the adjustment wheels 74 and 80. In actuality, the sets of rollers 86 and 88 are preferably actuated by respective (synchronized) electric motors 87 (FIG. 4) and 89 which can be energized by control knobs (replacing the adjustment wheels 74 and 80) located on a front panel (not shown) of the stand 64.

Figure 4:
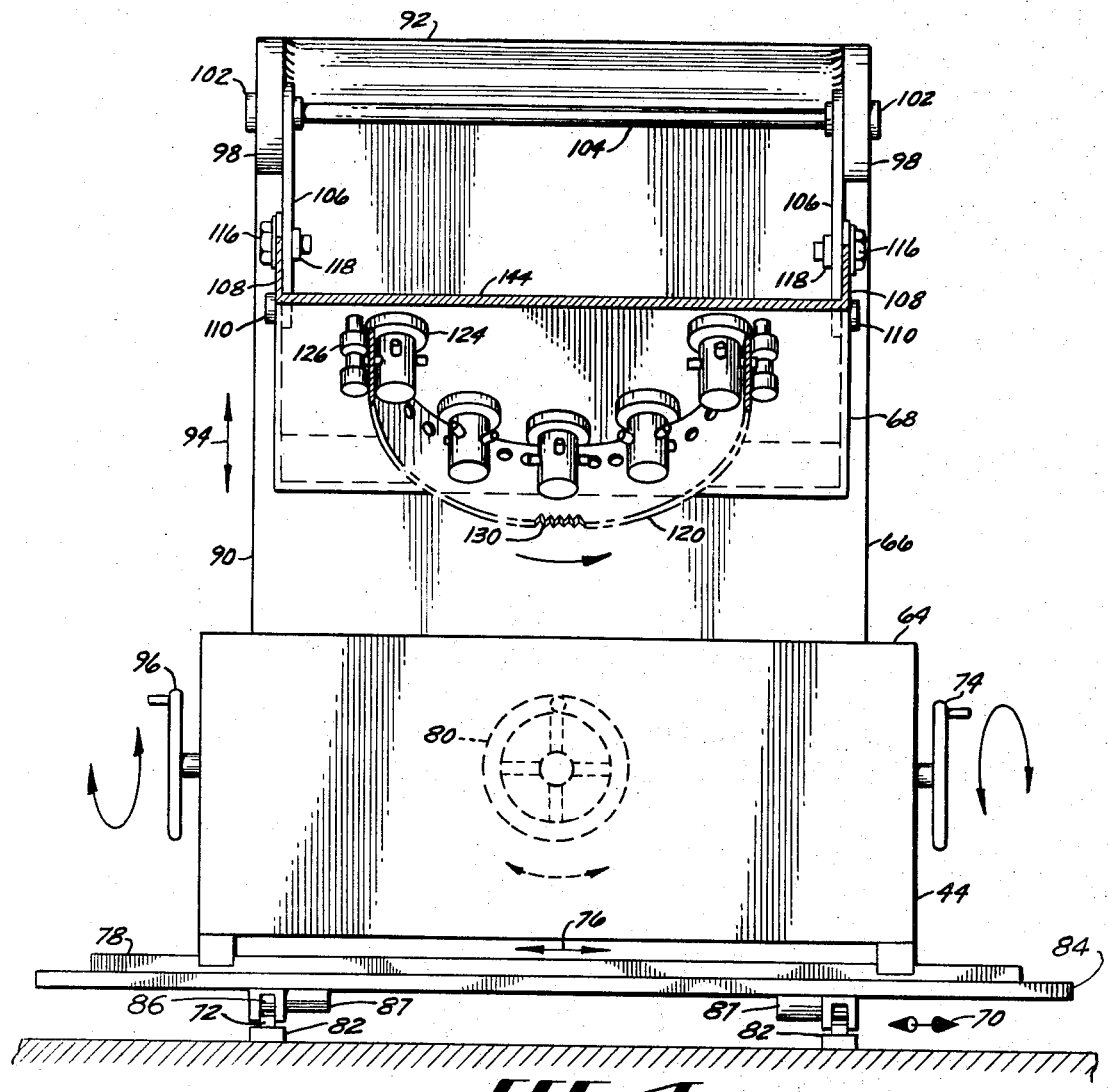
FIG. 4 is a rear elevational view, shown partially in section, of a component of the apparatus for generating aspheric surfaces as taken along the line 4—4 indicated in FIG. 3.

FIG. 4 is a rear elevational view, shown partially in section, of the movable component 44 as taken along the line 4—4 indicated in FIG. 3. Referring to both FIGS. 3 and 4, it is apparent that the angled beam 66 has been shown in simplified form and has a generally vertical section 90 and a generally horizontal section 92. The vertical section 90 of the beam 66 can be adjusted into and out of the stand 64 in the direction of arrow 94 (FIG. 4) by adjustment wheel 96 operating gearing engaging rack teeth (not shown) suitably positioned on the vertical section of the beam. Actually, the beam 66 is preferably actuated by an electric motor (not shown) which can be energized by a control knob (replacing the adjustment wheel 96) located on the front panel of the stand 64.

The end of the horizontal section 92 of the beam 66 has two pendent side flanges 98 having vertical slots 100 therein for accommodating roller bearings 102 mounted on the ends of a support rod 104. The upper ends of two linking plates 106 are connected to the rod 104 and the lower ends are pivotally connected to the side flanges 108 of the cutting tool drive and support structure 68 on pins 110 affixed midway between the ends thereof. The side flanges 108 have raised segments 112 with arcuate slots 114 therein which are radially centered on the pivot pins 110. Locking bolts 116 extend through the arcuate slots 114 and engage nuts 118. Thus, the structure 68 is freely movable vertically within a limited range determined by the vertical slots 100, and can be angularly pivoted on pins 110 over a limited range established by the arcuate slots 114 before the bolts 116 are tightened to lock the structure at a selected angle with respect to horizontal (or vertical).

The structure 68 supports a line cutting element or tool which can be an endless ribbon type cutting blade 120 having a line of sprocket holes 122 therein, adjustable drive sprockets 124 with backing rollers 126, and at least one electrical motor 128 to actuate a corresponding drive sprocket. Where another motor (indicated in phantom lines in FIG. 3) or more are used, the motors 128 are synchronous motors, of course. The support structure 68 and, hence, the cutting blade 120 can be adjusted with respect to the workpiece 42 by operating the adjustment wheels 74, 80 and 96 which will move the support structure back and forth, sideways, and up and down, respectively. The cutting edge 130 of the ribbon blade 120 lies in a plane which corresponds to the plane 26 indicated in FIG. 1. The plane of the cutting edge 130 can be tilted to the selected angle 28 with respect to horizontal by pivoting the structure 68 to the selected angle on pins 110 and tightening the locking bolts 116.

The structure 68 is also adjusted by means of adjustment wheels 74 and 80 so that, as shown in FIG. 3, the uppermost point of the cutting edge 130 coincides with the platform axis 62 which corresponds to the vertical axis 22 indicated in FIG. 1. The plane of the cutting edge 130 is held at the selected angle 28 with respect to horizontal but is freely movable vertically within the limited range determined by the length of the vertical slots 110 which keep the uppermost point of the cutting edge aligned with the platform axis 62. The plane of the cutting edge 130 is allowed, in this instance, to be freely movable vertically because it is normal practice in the grinding of lenses to load and position weights (not shown) on the support structure of the cutting device during the grinding process.

The ribbon blade 120 is ordinarily driven 2 to 3 times faster than the workpiece 42. Illustratively, with a three feet diameter plastic lens blank or workpiece 42 and the blade 120 as shown in FIG. 3, the workpiece 42 (turntable 40) can be driven 5 to 20 r.p.m. and the blade 10 to 60 c.p.m. The slower speeds can be used to obtain greater surface accuracy while the higher speeds permit faster removal of material. The maximum speed used is limited by the permissible amount of heat generated on the workpiece 42 surface causing distortion thereof. Thus, optimumly for surface cutting, the workpiece 42 can be rotated at 10 r.p.m. and the ribbon blade 120 driven at 30 c.p.m. (lineally about 2 feet per second), for example. The cutting edge 130 of the blade 120 should be suitably thin according to the size of the workpiece 42. Thus, the cutting edge 130 can be, for example, approximately 0.04 inch wide.

Of course, the workpiece 42 varies in circumferential or peripheral speed from apex to base; however, most of the surface generation action depends upon the lineal motion (cutting action) of the ribbon blade 120 and less on its side motion (smoothing action). After the workpiece 42 has been cut to nearly or substantially its desired or predetermined aspheric surface of revolution 132, a fine grind is accomplished when required by substituting a toothless blade for the blade 120 and applying a grinding compound during further generation of the aspheric surface. Finally, the ribbon blade 120 can be capped with a split rubber tube (not shown) having a suitable cloth facing charged with polishing rouge, and driven to polish and complete the aspheric surface 132. Slower speeds of the workpiece 42 and blade 120 are used during polishing (if necessary) than during cutting to achieve greater surface accuracy.

The ribbon blade 120 and its subsequent toothless blade substitute are, of course, installed on the adjustable drive sprockets 124 and backing rollers 126 such that the cutting edges of the blades are located in a plane which corresponds with the plane 26 indicated in FIG. 1, and the cutting edges correspond with and match the contour of the closed curve 36 shown in FIG. 2. When this is done, the desired or predetermined aspheric surface 132, corresponding to the aspheric surface 24 of FIG. 1, will be accurately generated on the workpiece 42. A flat plane can be achieved for the cutting edge 130 of the blade 120 by first loading it against a flat marble surface and running the blade briefly before applying it to the workpiece 42. One of the real advantages of this invention is the very large demagnification factor obtained therein. That is, a very large departure of the cutting tool path from a perfect circle, for example, produces a very small departure from a true sphere. Because of this, generated surface precision of the order of a few millionths of an inch can be achieved with tooling which is accurate only into the thousandths. It is noted that where the workpiece 42 is smaller than that shown in FIG. 3, as indicated for example by the phantom line 134, only that portion of the ribbon blade 120 engaging the smaller workpiece need conform with the corresponding contour portion of the curve 36. Thus, a wide range of different sizes of workpieces can be operated upon by the use of a single ribbon blade of a sufficient given circumferential or contour length. If the ribbon blade 120 is not endless, the motor 128 can be of the type having an oscillating output shaft or can be coupled through suitable mechanism to reciprocate the ribbon blade longitudinally.

Figure 5:
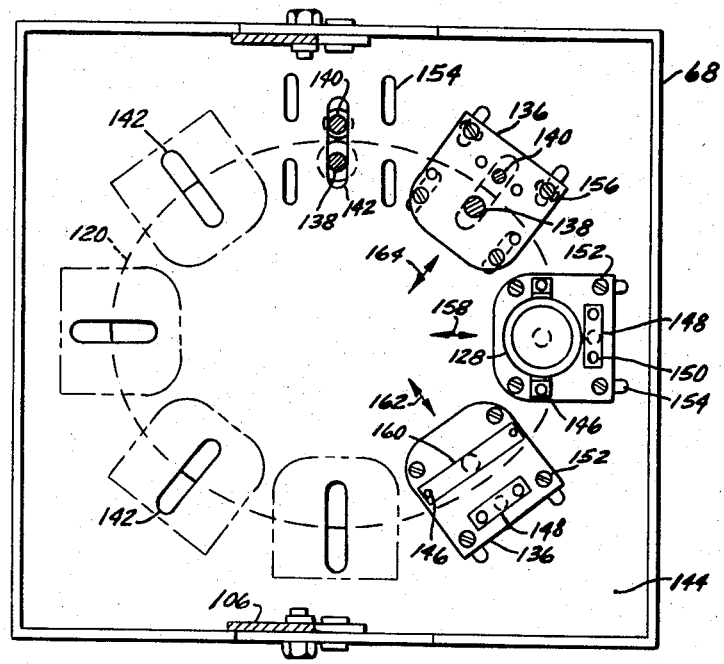
FIG. 5 is a view looking down upon the cutting tool drive and support structure of the apparatus for generating aspheric surfaces as taken along the line 5—5 indicated in FIG. 3.

FIG. 5 is a view looking down upon the cutting tool drive and support structure 68 as taken along the line 5—5 indicated in FIG. 3. This view has been simplified to some extent for clarity of illustration. A number of adjustable mounting plates 136 rotatably mount and retain end portions of the shafts 138 and 140 of the sprockets 124 and rollers 126. The shafts 138 and 140 extend through slots 142 provided in the floor 144 of the structure 68. The right end plate 136 has the drive motor 128 attached thereto by, for example, small screws 146 and the motor's output shaft is suitably coupled to shaft 138 of the associated sprocket 124. The end portion of shaft 140 of the corresponding backing roller 126 is suitably journaled and retained in bearing member 148 attached to the plate 136 by small screws 150. Adjustment screws 152 pass through slots 154 in the floor 144 of the structure 68 and engage retainer nuts 156 on the other side of the floor. Thus, the motor plate 136 can be adjusted in position in the direction of the arrow 158 and secured in place by tightening the screws 152.

The other plates 136 and their related slots, screws, bearing members, nuts, etc., are substantially identical to those of the motor plate. The other plates 136, however, normally have bearing members 160 instead of drive motors attached thereto by the small screws 146. The end portions of the other sprocket shafts 138 are, of course, suitably journaled and retained in the bearing members 160. The plate 136 shown just below the motor plate is adjustable in position in the direction of the arrow 162, and the plate shown just above the motor plate is adjustable in position in the direction of the arrow 164. The plate 136 just above the motor plate is shown in a sectional plan view taken at its top surface. It can be readily seen that the ribbon blade 120 and, hence, its cutting edge 130 can be adjusted accurately in contour to match the curve 36 (FIG. 2) by using a sufficient number of the adjustable mounting plates 136 with their associated sprockets 124 and backing rollers 126. A wide range of different contours can also be formed in the cutting blade 120 by the provision of reasonably long slots 142 and 154 in the floor 144 of the structure 68.

Figure 6:
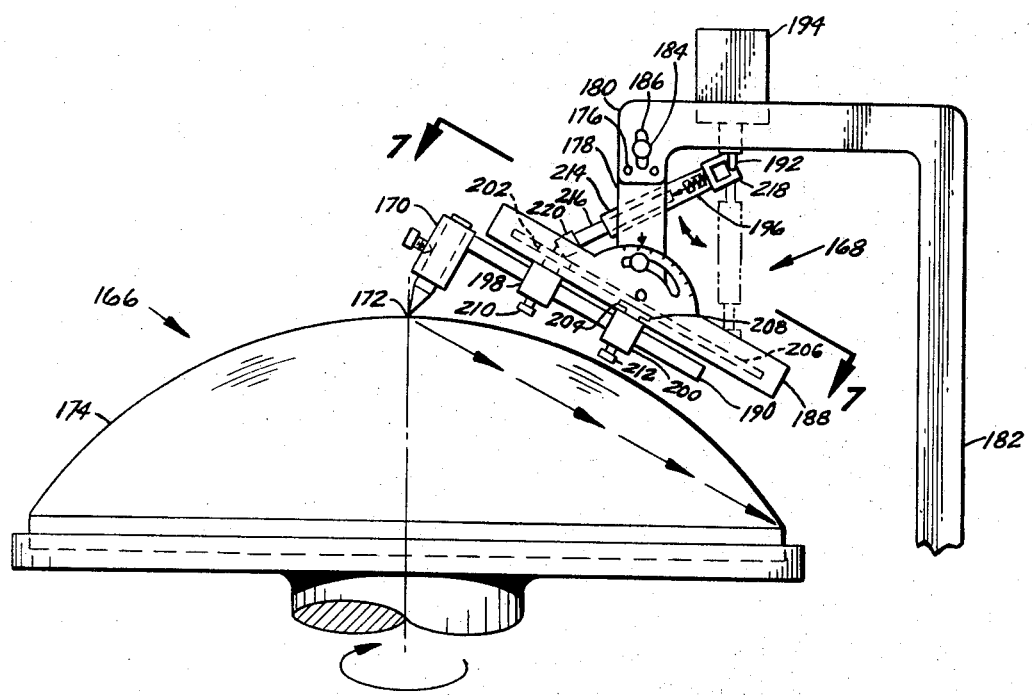
FIG. 6 is a fragmentary elevational view of another embodiment of the apparatus for generating aspheric surfaces.

FIG. 6 is a fragmentary elevational view of another embodiment 166 of the apparatus for generating aspheric surfaces according to this invention. The generating means of this embodiment 166 is basically the same as in the first embodiment 38 (FIGS. 3, 4 and 5) except that a flycutter arrangement utilizing an ellipsograph 168 with a cutting tool 170 replacing the usual pencil is used instead of the ribbon type cutting blade 120. The second embodiment 166 is capable of generating conicoid aspheric surfaces of revolution only since the cutting tool 170 of the ellipsograph 168 follows the locus of an ellipse. It is apparent that the cutting edge 172 of the tool 170 also provides, at any instant, an essentially point contact with the workpiece 174. Because of this, bolts 176 are used to secure the linking plates 178 fixedly to the pendent side flanges 180 on both sides of the beam 182 to prevent any free vertical movement of the ellipsograph 168 on roller bearings 184 in the vertical slots 186. The beam 182 can be gradually lowered against the workpiece 174 during the generation process by the adjustment wheel corresponding to wheel 96 shown in FIG. 4.

The ellipsograph 168 of FIG. 6 corresponds generally to the cutting tool drive and support structure 68 in FIG. 3. The ellipsograph 168 comprises support structure 188 pivotably connected to the linking plates 178, cutting tool arm 190 movably connected to the support structure, and drive means 192 including an electrical motor 194 connected to drive the tool arm through a variable length drive shaft 196. The support structure 188 can be adjusted and set to a selected angle with respect to horizontal (or vertical) as in the first embodiment 38. The arm 190 supports the cutting tool 170 at one end and is mounted in two blocks 198 and 200 which are respectively connected to guide rollers 202 and 204 supported in channels 206 and 208 of the structure 188. The arm 190 is longitudinally adjustable in the blocks 198 and 200, and the blocks can be secured to selected points on the arm by set screws 210 and 212, for example.

The drive shaft 196 includes a tubular member 214 housing an axially splined spring-biased telescoping member 216. The output shaft of the motor 194 is coupled to the upper end of the tubular member 214 by a universal joint 218, and the lower end of the telescoping member 216 is coupled to the guide roller 202 and block 198 by another universal joint 210. The channels 206 and 208 are perpendicularly oriented to each other and, as the drive shaft 196 is rotated by motor 194, the block 198 is rotated to turn the arm 190. Since the guide rollers 202 and 204 are confined in linear motion to their respective channels 206 and 208, the cutting tool 170 is driven in the locus of an ellipse.

Figure 7:
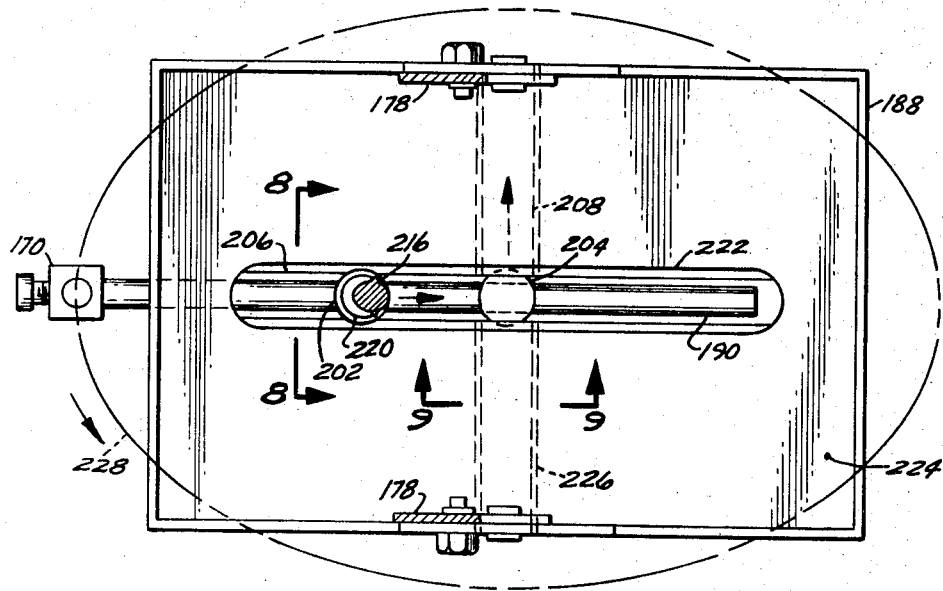
FIG. 7 is a view looking down upon the cutting tool drive and support structure of the apparatus for generating aspheric surfaces as taken along the line 7—7 indicated in FIG. 6.

FIG. 7 is a view looking down upon the support structure 188 of the ellipsograph 168 as taken along the line 7—7 indicated in FIG. 6. A longitudinal slot 222 is cut through the floor 224 of the structure 188, and a lateral slot 226 is cut in the lower part of the floor. It can be seen that the slots 222 and 226 are centrally oriented perpendicularly to each other. The slots 222 and 226 include respective channels 206 and 208 in which the guide rollers 202 and 204 are confined to linear motions. The axis of the roller 202 is perpendicular to the arm 190 at a point which is located at a distance from the axis of the tool 170 equal to half the minor axis of the ellipse 228, and the axis of the roller 204 is perpendicular to the arm at a point which is located at a distance from the axis of the tool equal to half the major axis of the ellipse.

Figure 8:
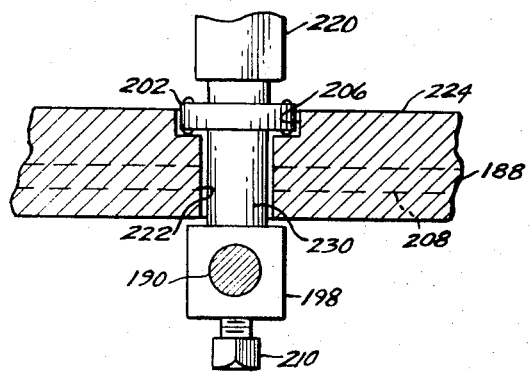
FIG. 8 is a fragmentary sectional view of the cutting tool drive and support structure as taken along the line 8—8 indicated in FIG. 7.

FIG. 8 is a fragmentary sectional view of the support structure 188 as taken along the line 8—8 indicated in FIG. 7. Block 198 is secured to the arm 190 by set screw 210. The block 198 is connected to the universal joint 220 by shaft 230 on which is mounted the guide roller 202. The shaft 230 extends through the longitudinal slot 222 in the floor 224 of the structure 188, and the roller 202 is guided in motion by the channel 206 thereof. The guide roller 202 is rotatably mounted on the shaft 230 and can be of suitable bearing construction to provide substantially fictionless movement in the channel 206.

Figure 9:
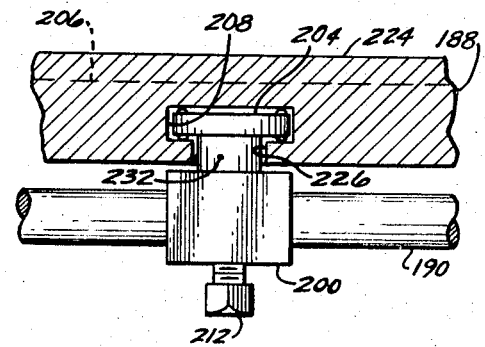
FIG. 9 is another fragmentary sectional view of the cutting tool drive and support structure as taken along the line 9—9 indicated in FIG. 7.

FIG. 9 is a fragmentary sectional view of the support structure 188 as taken along the line 9—9 indicated in FIG. 7. Block 200 is secured to the arm 190 by set screw 212. The block 200 is connected to guide roller 204 by shaft 232 extending into the lateral slot 226 in the lower part of the floor 224. The roller 204 is mounted on the end of the shaft 232 and is guided in motion by the channel 208 of the slot 226. The guide roller 204 is rotatably mounted on the shaft 232 and can be of a similar bearing construction as the guide roller 202 (FIG. 8) to provide substantially frictionless movement in the channel 208.

Figure 10:
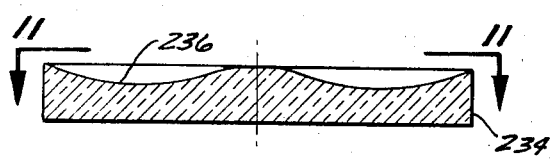
FIG. 10 is a diametrical sectional view of a corrector plate workpiece having a predetermined aspheric surface of revolution which was generated thereon with the apparatus shown in FIG. 3.

FIG. 10 is a diametrical sectional view of a corrector plate workpiece 234 having a predetermined aspheric surface of revolution 236 which can be generated thereon with the apparatus 38 shown in FIGS. 3, 4 and 5. While both the apparatus 38 and the apparatus 166 shown in FIGS. 6 and 7 can be used to generate concave and convex aspheric surfaces, the apparatus 38 is needed to generate the non-conicoid aspheric surface 236 on the workpiece 234. The ribbon type cutting blade 120 of the apparatus 38 can be suitably adjusted in contour by adjusting the various mounting plates 136 shown in FIG. 5. Only a certain number of the plates 136 need to be adjusted to establish the contour for a portion of the ribbon blade 120, however.

Figure 11:
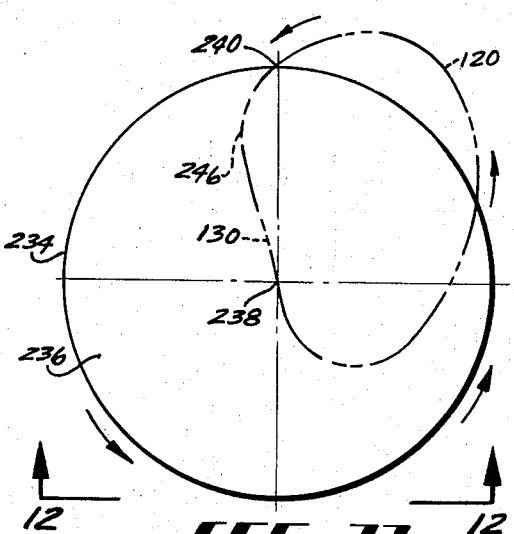
FIG. 11 is a plan view of the corrector plate workpiece as taken along the line 11—11 indicated in FIG. 10 together with the cutting edge of a ribbon type blade shown in phantom line thereon.

FIG. 11 is a plan view of the corrector plate workpiece 234 as taken along the line 11—11 indicated in FIG. 10. The cutting edge 130 of the ribbon blade 120 is shown in phantom line over the workpiece 234. Only the blade portion between the points 238 and 240 need be established in contour by the mounting plates 136 (FIG. 5) since the remaining portion of the ribbon blade 120 does not contact the surface 236 of the workpiece 234. The point 238 lies on the axis of rotation 242 (FIG. 12) of the workpiece 234, and the point 240 is at the peripheral edge of the aspheric surface 236.

Figure 12:
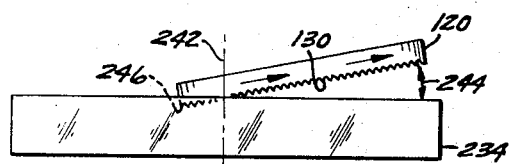
FIG. 12 is an elevational view of the corrector plate workpiece shown engaged by the ribbon type cutting blade as taken along the line 12—12 indicated in FIG. 11.

FIG. 12 is an elevational view of the corrector plate workpiece 234 engaged by the ribbon blade 120 as taken along the line 12—12 indicated in FIG. 11. The ribbon blade 120 is tilted to the selected angle 244 with respect to horizontal, and the lowermost point 246 on the cutting edge 130 corresponds with the leftmost point of the cutting edge shown in phantom line in FIG. 11. In achieving the condition illustrated in FIG. 12, the support structure 68 of FIG. 3 is moved sideways (into the plane of the paper) by moving the stand 64 on its tracks 78, then adjusted backwards or forwards by moving the stand on its tracks 72, and finally setting the ribbon blade 120 to the selected angle 244 by appropriately adjusting the support structure 68 and tightening its locking bolts 116.

While certain exemplary embodiments of this invention have been described above and shown in the accompanying drawings, it is to be understood that such embodiments are merely illustrative of, and not restrictive on, the broad invention and that we do not desire to be limited in our invention to the specific constructions or arrangements shown and described, for various obvious modifications may occur to persons having ordinary skill in the art.

We claim:

1. A method of generating an aspheric surface of revolution with a line cutting element operating on a blank that is normally supported horizontally and rotated about a vertical axis, which comprises the steps of:

driving said cutting element so that its cutting edge is moved along a noncircular locus including at least a predetermined noncircular portion which is maintained in a plane that intersects with said blank and is angularly adjustable with respect to horizontal; and adjusting said plane to a selected angle with respect to horizontal so that said cutting edge cuts said blank along at least a part of said predetermined noncircular locus portion which is maintained in said plane whereby said aspheric surface of revolution can be generated on said blank with rotation thereof about said vertical axis.

2. The invention as defined in claim 1 wherein said part of said predetermined noncircular locus portion matches the intersection of said plane and a predetermined aspheric surface of revolution to be generated on said blank.

3. The invention as defined in claim 2 wherein the normally uppermost point of said predetermined noncircular locus portion is aligned with said vertical axis.

4. The invention as defined in claim 2 wherein said part of said predetermined noncircular locus portion is a part of a predetermined ellipse locus portion and said predetermined aspheric surface of revolution to be generated on said blank is a conicoid surface of revolution.

5. The invention as defined in claim 4 wherein the normally uppermost point of said predetermined ellipse locus portion is aligned with said vertical axis.

6. Means for generating an aspheric surface of revolution on a blank which is normally supported horizontally and rotated about a vertical axis, said generating means comprising:

a line cutting element including a cutting edge which can be moved along a noncircular locus having at least a predetermined noncircular portion maintained in a plane that intersects with said blank and is angularly adjustable with respect to horizontal; and means for driving said cutting element so that its cutting edge cuts said blank along at least a part of said predetermined noncircular locus portion which is maintained in said plane whereby said aspheric surface of revolution can be generated on said blank with rotation thereof about said vertical axis.

7. Means for generating a surface of revolution on a blank which is normally supported horizontally and rotated about a vertical axis, said generating means comprising:

a line cutting element including a cutting edge which can be moved along a predetermined locus having at least a portion maintained in a plane that intersects with said blank and is angularly adjustable with respect to horizontal, said cutting element comprising an ellipsograph-actuated cutting tool having a cutting edge which is moved along said predetermined locus; and means for driving said cutting element so that its cutting edge cuts said blank along at least a part of said locus portion which is maintained in said plane whereby said surface of revolution can be generated on said blank with rotation thereof about said vertical axis.

8. The invention as defined in claim 6 wherein said cutting element comprises a strip-like cutting tool having a cutting edge which is moved along at least said part of said predetermined noncircular locus portion.

9. The invention as defined in claim 8 wherein said strip-like tool includes an endless ribbon type cutting blade having a cutting edge which is moved along at least said part of said predetermined noncircular locus portion.

10. Means for generating a surface of revolution on a blank which is normally supported horizontally and rotated about a vertical axis, said generating means comprising:

a line cutting element including a cutting edge which can be moved along a predetermined locus having at least a portion maintained in a plane that intersects with said blank and is angularly adjustable with respect to horizontal, said cutting element comprising a strip-like cutting tool including an endless ribbon type cutting blade having a cutting edge which is moved along said predetermined locus;

means for adjusting said ribbon blade so that its cutting edge is moved along a path which can be varied to conform with different configurations of said predetermined locus; and means for driving said cutting element so that its cutting edge cuts said blank along at least a part of said locus portion which is maintained in said plane whereby said surface of revolution can be generated on said blank with rotation thereof about said vertical axis.

* * * * *